United States Patent [19]

Hollowell

[11] Patent Number: 4,616,141

[45] Date of Patent: Oct. 7, 1986

[54] ELECTRICALLY ACTIVATED TENSION ELIMINATOR ACTUATOR

[75] Inventor: William Hollowell, Pacific Palisades, Calif.

[73] Assignee: American Safety Equipment Corporation, Troy, Mich.

[21] Appl. No.: 682,054

[22] Filed: Dec. 14, 1984

[51] Int. Cl.[4] ............ H02G 15/07; B60R 21/10
[52] U.S. Cl. ................. 307/10 SB; 280/801;
180/268; 242/107.7; 307/10 R
[58] Field of Search .......... 307/10 SB, 10 R;
180/268; 280/801, 802, 803, 804, 805, 806, 807,
808, 733; 340/52 E; 242/107.4 R, 107.4 A,
107.4 B, 107.4 C, 107.4 D, 107.6, 107.7

[56] References Cited

U.S. PATENT DOCUMENTS

| | | | |
|---|---|---|---|
| 3,771,742 | 11/1973 | Okada | 242/107.4 R |
| 3,834,646 | 9/1974 | Heath | 242/107.7 |
| 3,851,836 | 12/1974 | Sprecher | 242/107.7 |
| 3,869,098 | 3/1975 | Sprecher | 242/107.4 |
| 3,973,786 | 8/1976 | Rogers, Jr. | 280/747 |
| 4,002,219 | 1/1977 | Steinmann | 180/268 X |
| 4,023,746 | 5/1977 | Magyar | 242/107.7 |
| 4,065,072 | 12/1977 | Magyar | 242/107.7 |
| 4,187,925 | 2/1980 | Lindblad | 307/10 SB X |
| 4,307,853 | 12/1981 | Higbee et al. | 280/808 X |
| 4,367,851 | 1/1983 | Maeda et al. | 280/807 X |
| 4,489,804 | 12/1984 | Kamijo | 280/807 X |
| 4,498,642 | 2/1985 | Doty | 280/808 X |
| 4,529,143 | 7/1985 | Kanada et al. | 242/107.4 R X |
| 4,534,441 | 8/1985 | Kamijo et al. | 242/107.6 X |
| 4,555,831 | 12/1985 | Otzen et al. | 280/801 X |

Primary Examiner—William M. Shoop, Jr.
Assistant Examiner—Shik Luen Paul Ip
Attorney, Agent, or Firm—Poms, Smith, Lande & Rose

[57] ABSTRACT

A vehicle occupant operated device for selectively eliminating the rewinding tension in a seat belt retractor mechanism. The automobile battery is operably coupled to the device, using an occupant controlled switch to a combination limit and reversing switch. The limit switch is coupled to a permanent magnet, d-c, reversing motor. Through reduction gearing, the motor shifts a rod-like member which is adapted to actuate a tension eliminator mechanism within the seat belt retractor between two positions, one in which rewinding tension imparted to the seat belt is allowed, the other in which said tension is eliminated.

6 Claims, 10 Drawing Figures

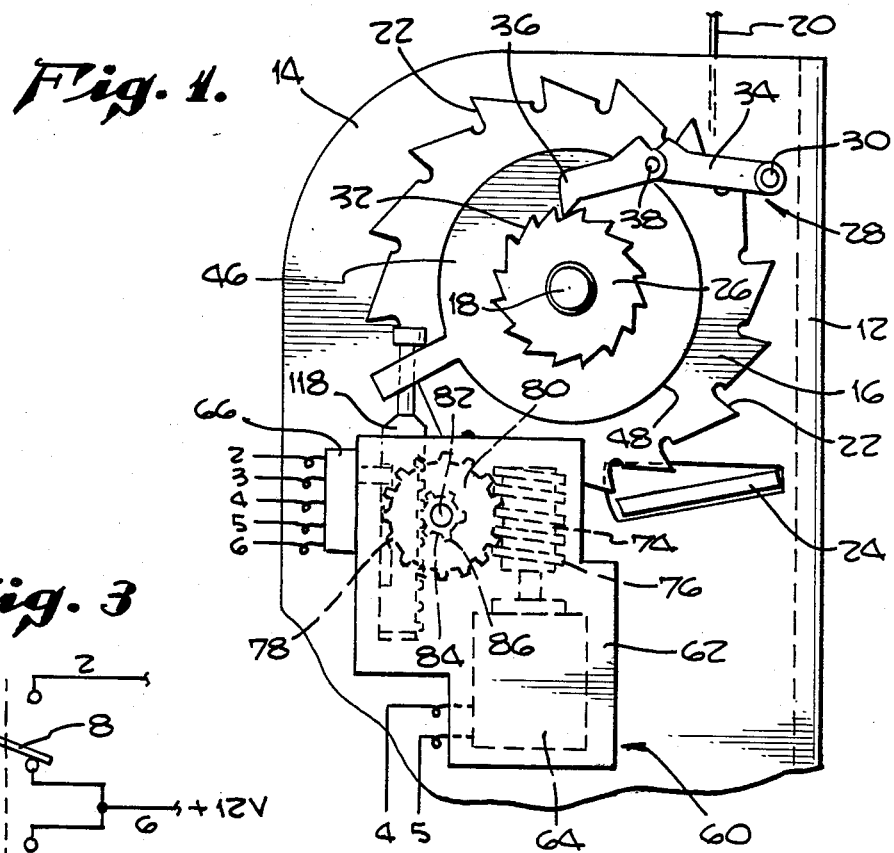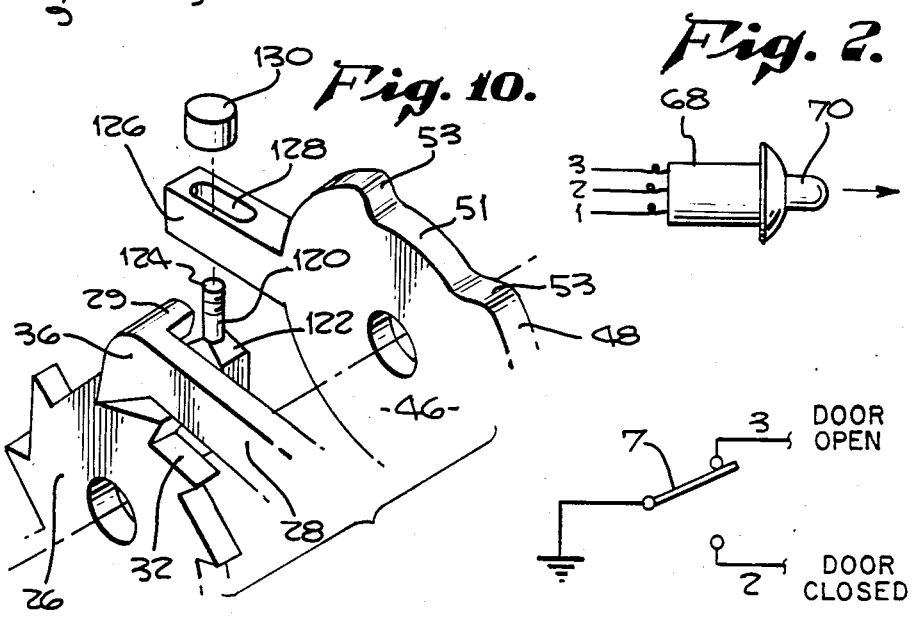

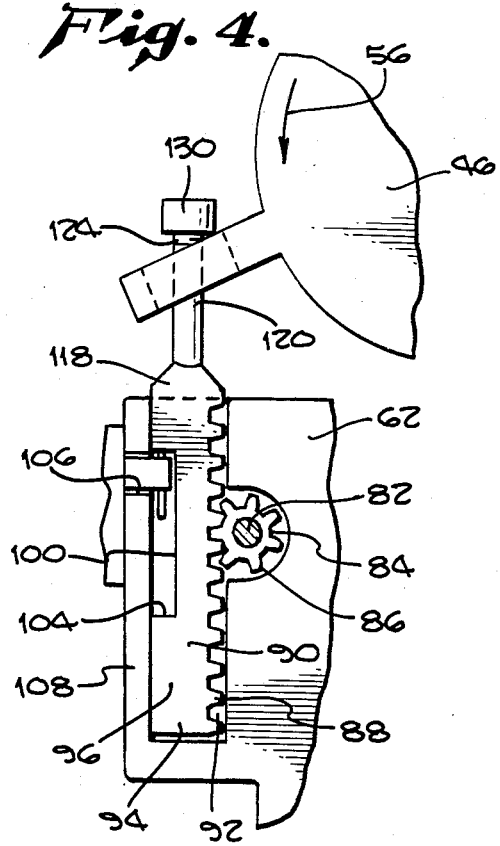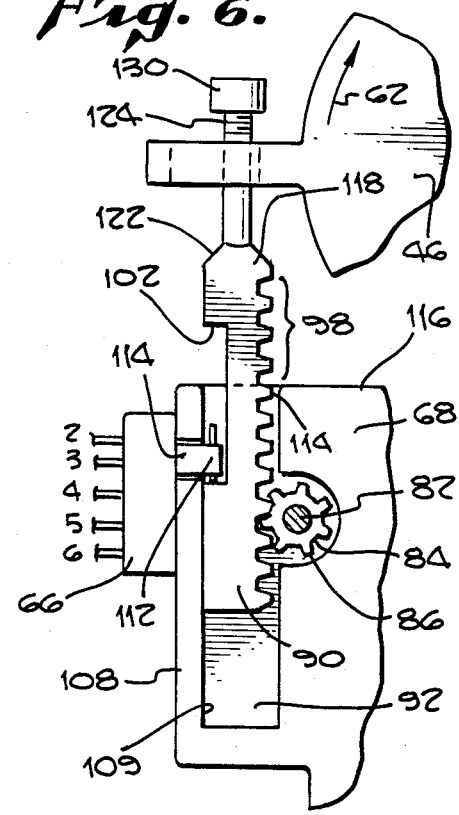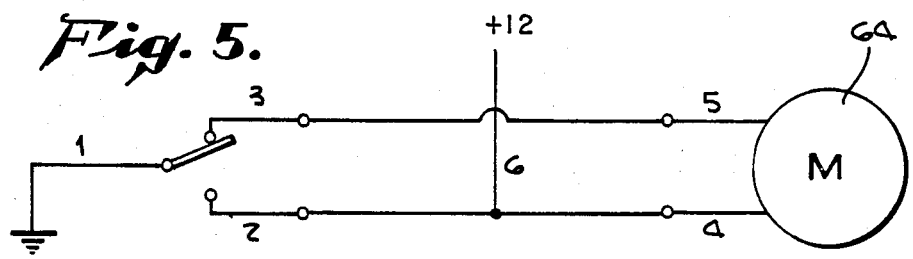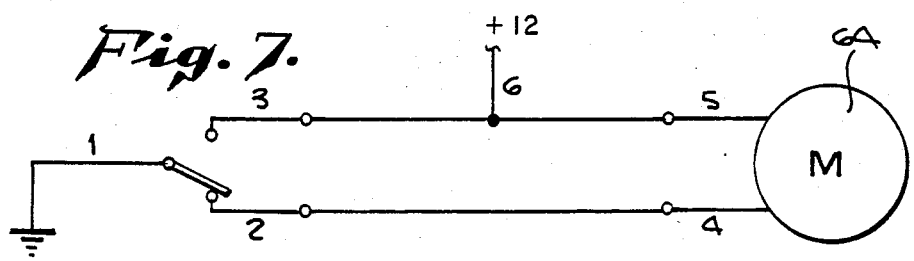

ELECTRICALLY ACTIVATED TENSION ELIMINATOR ACTUATOR

FIELD OF THE INVENTION

In general, the present invention relates to tension eliminator mechanisms for seat belt retractors and, more particularly, to a user-controlled, electrically powered, tension eliminator mechanism actuator for use in a seat belt retractor having the capability of alternating between a tensioned and tensionless mode.

BACKGROUND OF THE INVENTION

Seat belt retractor mechanisms undergo continual improvement in an effort to make them more prone to use by vehicle occupants and, hence, more effective. A major improvement was the addition of a ratchet mechanism to selectively prevent retraction of the seat belt webbing onto the spool. By so doing, the belt can be worn in a tensionless mode by the vehicle occupant, providing an unencumbered feeling. Generally, to release the ratchet mechanism, a locking pawl must be disengaged from a ratchet wheel. The ideal operating conditions are such that when the seat belt is protracted and latched, the pawl is firmly engaged with the ratchet wheel to prevent retraction motion. Likewise, in this engaged and locked state, the pawl should resist undesired disengagement from the ratchet wheel. On the other hand, when it is desired to remove and retract the seat belts—the tensioned mode-the pawl should disengage from the ratchet wheel with a minimum amount of force. Several mechanisms are currently employed for selecting between the tensioned and tensionless modes of operation.

One such mechanism is described in U.S. Pat. No. 3,973,786 by Rogers, Jr., issued Aug. 10, 1976, and assigned to General Motors Corporation. Rogers discloses a belt retractor for a vehicle occupant restraint system which has a winding prevention mechanism which is interlocked to the vehicle door so as to cancel the winding prevention mechanism when the door is opened. In apparatus such as Rogers, a complex cluster of discs, clutches, ratchet wheels, and pawls operates as the winding prevention mechanism for a conventional springbiased winding spool belt retractor. Actuation and cancellation of the winding prevention mechanism is made responsive to a predetermined sequence of belt winding and unwinding movements which the user must perform. A mechanical linkage between a door activated plunger and the complex winding prevention mechanism moves a pawl in the mechanism between a detenting and undetenting positions whereby a tensionless mode can be instituted when the door is closed. A similar device is shown in U.S. Pat. No. 4,065,072 by Magyar, issued Dec. 27, 1977, also assigned to General Motors Corporation.

Wherefore, it is an object of the present invention to provide an improvement to mechanisms used with a seat belt retractor for selecting between a tensioned and tensionless mode of operation.

It is a further object of the present invention to provide a simple and reliable apparatus for a seat belt retractor for selecting between a tensioned and tensionless mode.

Another object of the invention is to provide an electrically activated mechanism for a seat belt retractor for selecting between a tensioned and tensionless mode.

A further object of the invention is to provide a tensioned and tensionless mode seat belt retractor mechanism with a user accessible, electrical device for mode selection.

SUMMARY OF THE INVENTION

The present invention, in its broad aspect, provides an improved apparatus adapted to selectively actuate a tension eliminator mechanism found in a seat belt retractor. In a seat belt retractor, such as that commonly found in a modern automobile, a spring-biased spool, journally mounted to a main frame (which is in turn mounted to the vehicle frame or bodywork), is used to hold the seat belt for protraction or retraction, respectively depending upon whether the vehicle occupant is putting on or removing the seat belt. For user comfort, such retractors include a mechanism adapted to eliminate spring tension on the spool while the seat belt is being worn. Also, such retractors can incorporate a mechanism responsive to the seat belt user actuation for selectively deactivating said tension eliminator in order that the belt webbing can be rewound on the spool by the retractor's spool biasing spring. Commonly, the tension eliminator mechanism is a ratchet wheel attached to the spool and a pawl, pivotally mounted to the main frame of the retractor, for releasably engaging the teeth of the rachet wheel. Those teeth are oriented so that when engaged by the pawl, retraction motion of the spool is prohibited—i.e., a tensionless mode is selected.

The improved apparatus of the present invention is used for actuating the tension eliminator and includes a d-c reversing motor which turns a shaft linked to a rod-like member. The rotational force exerted by the motor shaft is translated to linear motion of the rod-like member through reduction gearing or other suitable conversion devices. The force imparted by the linear motion of the rod is used to shift the tension eliminator pawl between its engaged and disengaged operative positions. The motor is coupled to the automobile's battery or electrical system for its main power source via two switches, a seat belt user accessible, two-position switch to turn the motor on and a limit switch to shut-off the motor when the rod reaches predetermined positions.

Other objects, features, and advantages of the present invention will become apparent from a consideration of the following detailed description and from the accompanying drawings.

BRIEF DESCRIPTION OF THE DRAWINGS

FIG. 1 shows a plan view of a seat belt retractor incorporating the tension eliminator actuator according to the present invention.

FIG. 2 shows a two-position switch and electrical equivalent circuit diagram for use with the actuator of FIG. 1.

FIG. 3 shows an electrical equivalent circuit diagram of the limit switch incorporated in the actuator of FIG. 1.

FIG. 4 shows a plan view of a cut-away portion of the actuator of FIG. 1 in its seat belt tensioned mode position.

FIG. 5 shows an electrical equivalent circuit diagram of the limit switch position of FIG. 4.

FIG. 6 shows a plan view of a cut-away portion of the actuator of FIG. 1 in its seat belt tensionless mode position.

FIG. 7 shows an electrical equivalent circuit diagram of the limit switch position of FIG. 6.

FIG. 10 shows an exploded, perspective view of a portion of the actuator of FIG. 1 as adapted for use with a differently configured tension eliminator mechanism.

DETAILED DESCRIPTION OF THE INVENTION

Figure 8:
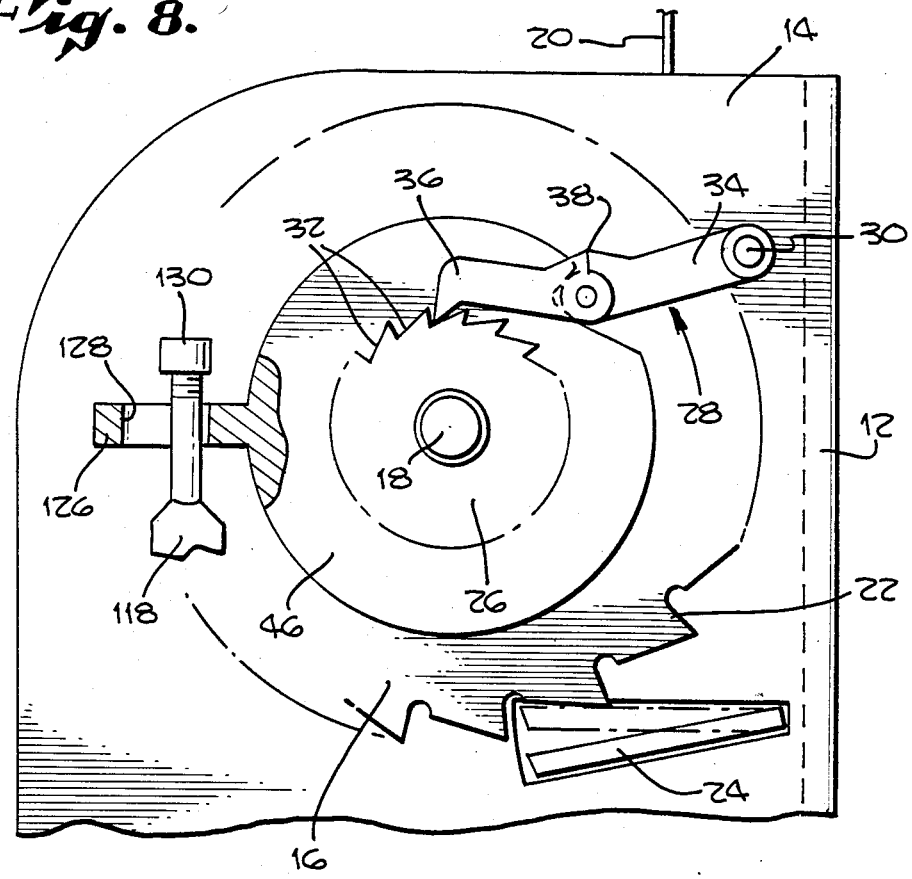
FIG. 8 shows a plan view of a cut-away portion of the actuator of FIG. 1 in its seat belt tensionless mode position.

Referring more particularly to the drawings, FIG. 1 shows the present invention incorporated in a conventional seat belt retractor 10 as is commonly found, for example, in a modern automobile. The retractor's operating mechanism has a mounting plate 12 and side plates 14 extending transversely from the mounting plate 12 in order to form a main frame or housing for the retractor 10. Mounting plate 12 is used to securely fasten the retractor 10 to the vehicle body or frame. A spring biased spool 16 is journally mounted between side plates 14 and adapted to rotate about shaft 18.

Seat belt webbing 20 is wound about the spool 16 for protraction and retraction. A spring (not shown) is operably connected to the spool 16 to bias it towards the retracted position such that the seat belt webbing 20 can be pulled out against the bias of the spring and, upon release, will be retracted onto the spool 16 by the tension force of the spring. The spool 16 is provided with teeth 22 along its outer periphery. A locking plate 24 will be moved into engagement with one of these teeth, as shown in the ghosted position of FIG. 8, as a result of an emergency condition in order to prevent protraction of the seat belt webbing 20 in order to restrain the vehicle occupant wearing the seat belt webbing 20 from undesired movement.

Seat belt retractor mechanisms of the type being shown in FIG. 1 also include a tension eliminator device to put the retractor into a tensionless mode for user comfort. Such devices generally include a ratchet wheel 26 connected to move in conjunction with the spool 16, a friction disc 46 and a pawl, indicated generally at 28. The releasable pawl, generally indicated as 28, is pivotally mounted on shaft 30 to the side plate 14 on one end with the opposite end being adapted to engage the teeth 32 of the ratchet wheel 26. Disc 46 is normally driven off of frictional engagement with wheel 26 to place the pawl into and out of engagement with the ratchet teeth 32 in response to spool rotation that normally occurs as a user places the seat belt in use as is known in the art. Examples of such mechanisms can be seen by reference to the U.S. Pat. Nos. (3,869,098), to Sprecher, (3,700,184), Francis, and (3,834,646) Heath.

A more complete description of the operation of the arrangement shown in FIG. 1 for this tension eliminator mechanism can be found in co-pending patent application Ser. No. 412,880, assigned to the same assignee of this application.

Basically, the pawl 28 includes a first portion 34, pivotally mounted on the shaft 30 at one end, and a second portion 36, adapted on one end for engagement with the teeth 32 of the ratchet wheel 26. The other ends of the portions 34, 36 are hinged together about pivot 38.

A cam disk 46 is concentrically disposed about the shaft 18 with its camming surface 48 is contact with the pawl 28 adjacent the hinge pivot 38. Camming surface 48 contains a notch 50 which is positioned adjacent to pivot 38 when the pawl 28 is in its locked position, as best seen in FIG. 8.

Figure 9:
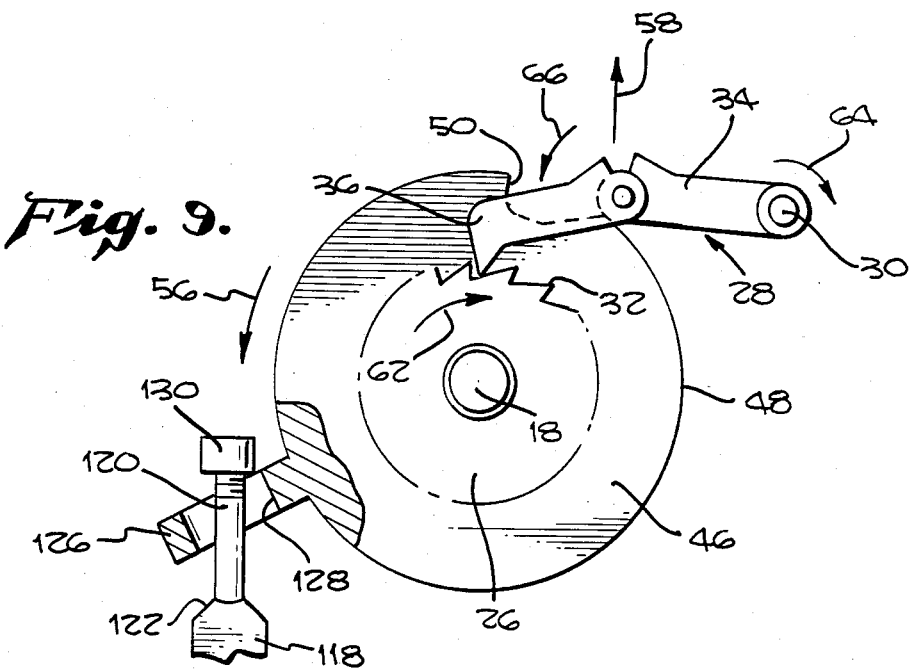
FIG. 9 shows a plan view of a cut-away portion of the actuator of FIG. 1 in its sealt belt tensioned mode position.

The cam disk 46 operates as a pressure release mechanism in the manner shown in FIG. 9 in response to the direction of rotation of the spool as is known in the prior art. Upon the cam disk 46 being rotated in the direction of the arrow 56, the pivot 38 is forced upward in the direction of arrow 58 by the camming surface 48 of the cam disc 46. By so doing, the pawl 28 toggles and is released so that the pawl 28 assumes the released position wherein it is free to flex longitudinally.

Once the pawl 28 has been toggled to the released position of FIG. 9, it is free to further flex and allow the ratchet wheel 26 to rotate in the direction of arrow 62. As ratchet wheel 26 rotates in the direction of arrow 62, the teeth 32 push against the second portion 36 of pawl 28. Since the pawl 28 is now free to flex, second portion 36 pushing against pivot 38 causes first portion 34 to rotate upward about shaft 30 in the direction of arrow 64. As first portion 34 rises, second portion 36 moves about pivot 38 in the direction of the arrow 66. This allows the ratchet wheel 26 to rotate in the direction of arrow 62 unencumbered by the pawl 28. Retractor 10 is thus in its tensioned mode and seat belt webbing 20 is wound about the spool 16 by the spool's biasing spring.

An alternative tension eliminator pawl 28 and ratchet wheel 26 embodiment is shown in FIG. 10, wherein pawl 28 has a laterally extending arm 29 with adjacent portion 36 adapted for engagement with the teeth 32 of ratchet wheel 26. In this alternative, cam disc 46 has a cam surface 48 with a cut-out section 51, whereby shoulders 53 are aligned to maneuver pawl 28 into and out of engagement with ratchet wheel 26 to create the tensionless and tensioned mode, respectively, in retractor 10.

In order to override the retractor 10 between tensioned and tensionless modes created by the tension eliminator device just described, according to the present invention an electrically activated tension eliminator actuator, indicated generally as 60, is provided, contained in an actuator housing 62 which can be mounted to side plate 14.

A permanent magnet, d-c, reversing motor 64 is coupled to the automobile electrical system positive voltage source by leads 4, 5 through limit switch 66, lead 6 with the ground connection provided through limit switch lead 2 or 3 through a 3-pole, two-position plunger switch 68. The electrical operation is described in detail hereinafter.

Motor 64 is adapted to turn motor shaft 72. Fixedly mounted on shaft 72 is worm gear 74. Teeth 76 of worm gear 74 mesh with teeth 78 of worm wheel 80. Worm wheel 80 is clustered with pinion gear 84. Worm wheel 80 and pinion gear 84 are adapted to rotate about gear shaft 82, which is journally mounted to actuator housing 62. Motor shaft 72 and gear shaft 82 are oriented in mutually perpendicular planes, offset by the sum of the radii of the worm gear 74 and worm wheel 80 in order to ensure proper intermeshing of their teeth.

Referring now to FIGS. 4 and 6, actuator 60 includes a rod member 90. Rod 90 is designed to fit slidingly into cavity 92 of housing 62. Rod 90 has a rack 98 integrally formed on side 94 adjacent pinion 84 in housing 62. Rack 98 has teeth 88 designed to mesh with teeth 86 of pinion 84. Rod 90 is formed to have an elongated notch 100 on side 96, which is opposite the side 94 on which rack 98 is formed. Notch 100 forms an upper wall 102 and lower wall 104 used to operate limit switch 66 as will be described hereinafter.

An aperture 106 extends through wall 108 of housing 62 and into cavity 92. Limit switch 66 is a two-position, 6-pole, double-throw toggle-type switch, having a sliding toggle pin 110 operatively mounted at one end 112 of a toggle pin holer 114. Limit switch 66 is affixed to the external surface of wall 108 in a manner such that the toggle pin holder 114 protrudes through the aperture 106 and into cavity 92. End 112 and toggle pin 110 extend into said cavity 92 such that end 112 and pin 110 extend beyond the inner surface 109 of wall 108, where pin 110 can be contacted by upper wall 102 and lower wall 104 of notch 100, but less than a distance where end 112 would interfere with the sliding motion of rod 90.

Housing 62 has an aperture 114 in top surface 116 formed at the upper end of cavity 92 and through which the upper extremity 118 of rod 90 protrudes. Upper extremity 118 of rod 90 has a circular cross-sectioned, tapered extension 120 forming shoulder 122. Referring briefly to FIG. 10, an externally treaded end 124 of the extremity 118 is designed of appropriate diameter such that it can pass freely through hole 128 in the fixed lever arm 126 of the cam disc 46. Cap 130 is internally threaded to match the treads of externally threaded end 124, but is of a cross-sectional diameter greater than the bore of hole 128 in lever arm 126. Hence, once end 124 is passed through hole 128 and cap 130 is screwed on, rod 90 of actuator 60 is fixed in operable connection to tension eliminator cam disk 46.

Turning to FIGS. 2 through 7, the electrical connections and operation of the tension eliminator actuator now can be described. A two-position, three-pole plunger switch 68 can be located in the door jamb of the automobile. By doing so the driver or passenger automatically selects the position of the switch 68 by opening or closing the door.

Let us assume that the driver of an automobile has reached his destination and desires to exit the vehicle. Unbuckling the seat belt, it is now desirable to have the seat belt rewound in order to remove it from a position where it would impede the egress of the driver. While driving with the seat belt on, the belt retractor 10 was in the tensionless mode in order that the belt 20 would be comfortable for wearing by the driver. Hence, the tension eliminator mechanism was in its locked position— tensionless mode—as was shown in FIG. 8. Similarly, with the tension eliminator mechanism in its locked position, rod 90 is in its extended position, as shown in FIG. 6, with the toggle pin 112 putting the limit switch 66 in the configuration exemplified schematically by FIGS. 3 and 7. In other words, an open circuit exists and no current is flowing to motor 64. In order to rewind the belt 20, the tension eliminator mustbe moved toward and into its unlocked position, as shown in FIGS. 1, 4, and 9.

The sequence of operation begins when the door is opened by the driver. Plunger 70 of switch 68 moves to its extended position as shown in FIG. 2. Center lead 1 of switch is permanently connected to electrical ground. Contact blade 7 is moved by plunger 70 from lead 2 to lead 3. When blade 7 reaches the contact point of lead 3, a complete circuit is established for motor 64 as shown in the electrical equivalent circuit diagram of FIG. 5. Leads 4 and 5 of limit switch 66 being connected to motor 64, upon completion of this circuit, the motor is activated to turn in the direction such that motor shaft 72 and worm gear 74 turn in the appropriate direction to impart motion to rod 90, through reduction gearing cluster 80, 84 and rack 98, so that a turning force in the direction of arrow 56 of FIGS. 4 and 9 is imparted to cam disc 46. As a result of this force, cam surface 48 causes pawl 28 to be lifted out of engagement with teeth 32 of ratchet 26 and, as described above, the retractor 10 is put into the tensioned mode, whereby the force of the spool tension spring can retract the belt.

As rod 90 travels into cavity 92, upper wall 102 will contact and exert a force on toggle pin 110, as shown in FIG. 4. Toggle pin 110 in turn causes blades 8 and 9 of limit switch 66 to leave the contacts points for leads 3,5 and 4,6 and into the position where they connect leads 2,4 and 5,6. Hence, the circuit is broken and motor 64 shuts off with retractor 10 in the tensioned mode.

To reverse this action, the driver needs merely to close the car door which will depress plunger 70 of switch 68 and reverse the process, returning retractor 10 to a condition wherein the tensionless mode can be reestablished by placing the safety belt into use. That is, the circuit of FIG. 7 will be completed and motor 64 will drive rod 90 in the opposite direction until lower wall 104 contacts toggle pin 110, pushing it into its other position as shown in FIG. 6, and again opening the circuit to shut off motor 64.

It should be understood that while the embodiment described herein is primarily directed to an application in seat belt retractor mechanisms, it could be incorporated in any similar mechanism where a ratchet wheel has a releasable pawl cooperating therewith. Moreover, in the foregoing description of the present invention, a preferred embodiment of the invention has been disclosed. It is to be understood that other design variations are within the scope of the present invention.

What is claimed is:

1. In a safety belt retractor for use in restraining a passenger in a vehicle, the retractor including a safety belt wound upon a spool for protraction to a position of use and retraction under a spool rewind spring bias to a storage position, and a spring tension eliminator mechanism for selectively inhibiting spool rewind rotation in response to the bias occurring when said belt is manipulated into a position for use, said mechanism being known per se and including a ratchet wheel, a releasable pawl and a frictionally driven cam disc for moving said pawl into and out of engagement with said ratchet to normally operate said mechanism between belt rewind inhibiting and noninhibiting conditions in response to spool rotation imparted by protractive and retractive belt manipulation occurring when said belt is manipulated into said position of use the improvement in an actuator means for overriding operation of said tension eliminator mechanism upon operation of a vehicle component, such as the vehicle door between door closed and door open positions, comprising the provision of:

override means for overriding said tension eliminator mechanism's operation between belt rewind inhibiting and noninhibiting conditions in an overriding manner relative its operation otherwise caused by the normal operation of said mechanism by belt manipulation by the user;

electrical motor means connected to said override means for operating said override means to predetermined positions upon selective operation of said motor means, and switch means, associated with a component of said vehicle operable by said user, for selectively connecting said motor means to a source of electrical energy to electrically operate said override means via said motor means to override the operation of said tension eliminator mechanism in response to said user manipulation of said component.

2. The improvement to a seat belt retractor tension eliminator actuator means as set forth in claim 1, wherein said electrical motor means further comprises:

a limit switch coupled to a motor of said motor means and operably disposed to induce shut-off said motor when said override means reaches said predetermined positions.

3. The improvement of a seat belt retractor tension eliminator actuator means as set forth in claim 5, wherein said coupling means further comprises:

a switch, coupled to said limit switch, whereby said motor operation can be selectively actuated by said seat belt user.

4. The improvement to a seat belt retractor tension eliminator actuator means as set forth in claim 3, wherein said switch further comprises:

a 3 pole, 2 position door-jam switch adapted to occupy a first position of said positions when an automobile door is open and a second position of said positions when said door is closed, whereby electrical energy is coupled to said motor means.

5. In an automobile seat belt retractor having a frame, a spring-biased spool journally mounted to the frame and having a restraint belt attached thereto for protraction and retraction, a ratchet wheel connected to the spool and a pawl pivotally mounted to said frame for releasably engaging the teeth of said ratchet wheel to prohibit retraction motion of the spool, and an actuator responsive to seat belt protraction and retraction for imparting pivotal motion to said pawl, an improved actuator override means comprising:

rod-like means adapted to move said pawl from a first position, wherein said pawl is disposed to engage the teeth of said ratchet whereby spring tension is eliminated from said spool, to a second position, whereby said pawl is unable to engage the teeth of said ratchet wheel;

a permanent magnet, d-c, reversing motor;

a shaft, adapted to rotate in response to the output of said motor;

a switch, accessible to said seat belt user, whereby said motor can be selectively put into an on-mode;

a limit switch coupled to said motor and operably disposed to induce an off-mode when said rod-like means reaches predetermined positions; and gearing disposed to convert the output of said motor into mechanical force, whereby said rod-like means transits from a first of said predetermined positions to a second of said predetermined positions.

6. The improved actuator means as set forth in claim 5, wherein said switch comprises:

a three pole, 2-position door-jam switch, operably disposed to be in its first position when the automobile door is open and in the second positon when the automoblie door is closed, whereby an automobile electrical system output is selectively coupled to said motor.

* * * * *